United States Patent [19]

Sanders et al.

[11] 3,978,449

[45] Aug. 31, 1976

[54] METHOD AND APPARATUS FOR IN-BAND SIGNALLING IN DATA TRANSMISSION

[75] Inventors: Ray W. Sanders, Los Angeles; Neil T. Keyes, Palos Verdes; Stephen W. Harting, Los Angeles; Donald J. Mueller, Hawthorne, all of Calif.

[73] Assignee: Computer Transmission Corporation, El Segundo, Calif.

[22] Filed: Jan. 27, 1975

[21] Appl. No.: 544,207

[52] U.S. Cl. ............... 340/146.1 BA; 178/69 G; 325/155; 340/146.1 AB; 340/146.1 C
[51] Int. Cl.² ............... H03K 5/18; H04L 1/08
[58] Field of Search ............... 178/69 G; 325/155; 340/146.1 AB, 146.1 BA, 146.1 C, 348

[56] References Cited
UNITED STATES PATENTS 3,427,585  2/1969  Milford ............... 340/146.1 BA
3,624,603  11/1971  Delcomyn ............... 340/146.1 BA

*Primary Examiner*—R. Stephen Dildine, Jr.

[57] ABSTRACT

An in-band signalling system for the transmission of both data and control signals through a common communications channel is disclosed. Unique means of distinguishing data bits from control bits is employed without the use of additional bandwidth over that which would be required for the data alone.

A novel method for signalling includes the steps of translating the data bits into a different code set than the original, examining it for control words and if any are present, modifying or corrupting the data and thereafter combining on a time division basis the translated and/or modified data and control words over a transmission channel. To receive, data is inversely modified and control words detected. Error detection of control words is achieved by translating control words followed by their complements.

17 Claims, 5 Drawing Figures

CONTROL WORD SEQUENCE 11010101010101010101010101010101 11100011 00011100

PREAMBLE   8 BITS   INVERTED 8 BITS

31 BITS

METHOD AND APPARATUS FOR IN-BAND SIGNALLING IN DATA TRANSMISSION

BACKGROUND OF THE INVENTION

Data communication systems make use of various channels such as telephone, radio or optical links to transmit digital data from one point to another. In order to establish route and conduct certain testing and problem diagnosis, certain control information has to be communicated between various terminals in the system. Terminal equipment at the receiving end of the channel must be prepared and notified to accept the data by means of control words, and the transmitting end of the link must be notified when the receiving station is ready to receive data and to signal it.

In the prior art, such control signals were transmitted over a separate link from that which was used to transmit the data, or was sent at a specified time known to both the transmitter and receiver so as to distinguish it from data. Such communication has often included voice transmission wherein the operators at both ends of the link would confirm that the link had been established and that the equipment was in readiness for the transmission. Such techniques require additional bandwidth in the form of a separate channel or time allocated within the data channel to distinguish control information from data. In synchronous links, differences in communications time caused by different signal paths between the two links require that sufficient time be allocated before data is transmitted to insure that the receiver has properly received the control signals. In either case, it is required to establish or maintain a separate control channel in order to regulate the transmission of data. Additional bandwidth in the form of a separate channel or in allocated times on the primary channel are referred to as overhead connected with the transmission of the data.

BRIEF STATEMENT OF THE INVENTION

This invention generally relates to digital data communications systems. More particularly, the present invention relates to communications systems wherein control signals are required as well as data between the transmit and receive sites. The present invention describes a means of communicating both the control signals and the data over the same channel.

Briefly described, the present invention involves a communication system in which multibit words representing either data or control signals are transmitted. Identification for the control words is employed so that no restriction is required on the bit sequences that may be transmitted as data including data signals identical with control words.

More particularly, the in-band signalling system, in accordance with the invention, comprises a means of encoding the control bits in a different format from that used for the data bits. In the system, code translators are employed to recode the data in such a way that it cannot be interpreted as control signals. A monitor at the transmitter is employed to examine the encoded data prior to its transmission to delete from the transmitted sequence any bit pattern that could be erroneously interpreted as control signals. In such cases where deletion is required, the original data stream is retransmitted in the normal manner since the deletion process is interpreted as a data error. In this manner, any data bit pattern retransmitted will be encoded in such a way that it will have low probability of being encoded again with the same bit pattern. The method may be employed in either simplex or duplex transmission. In the former case, the receiver notifies the transmitter that the intended message was not received and causes the message to be retransmitted. In one way transmission systems, error detection at both the transmitter and receiver cause both ends of the link to recognize that retransmission of the data will take place.

BRIEF DESCRIPTION OF THE DRAWINGS

The above features of this invention may be more clearly understood by the following detailed description and by reference to the drawings in which.

DETAILED DESCRIPTION OF THIS INVENTION

Figure 1:
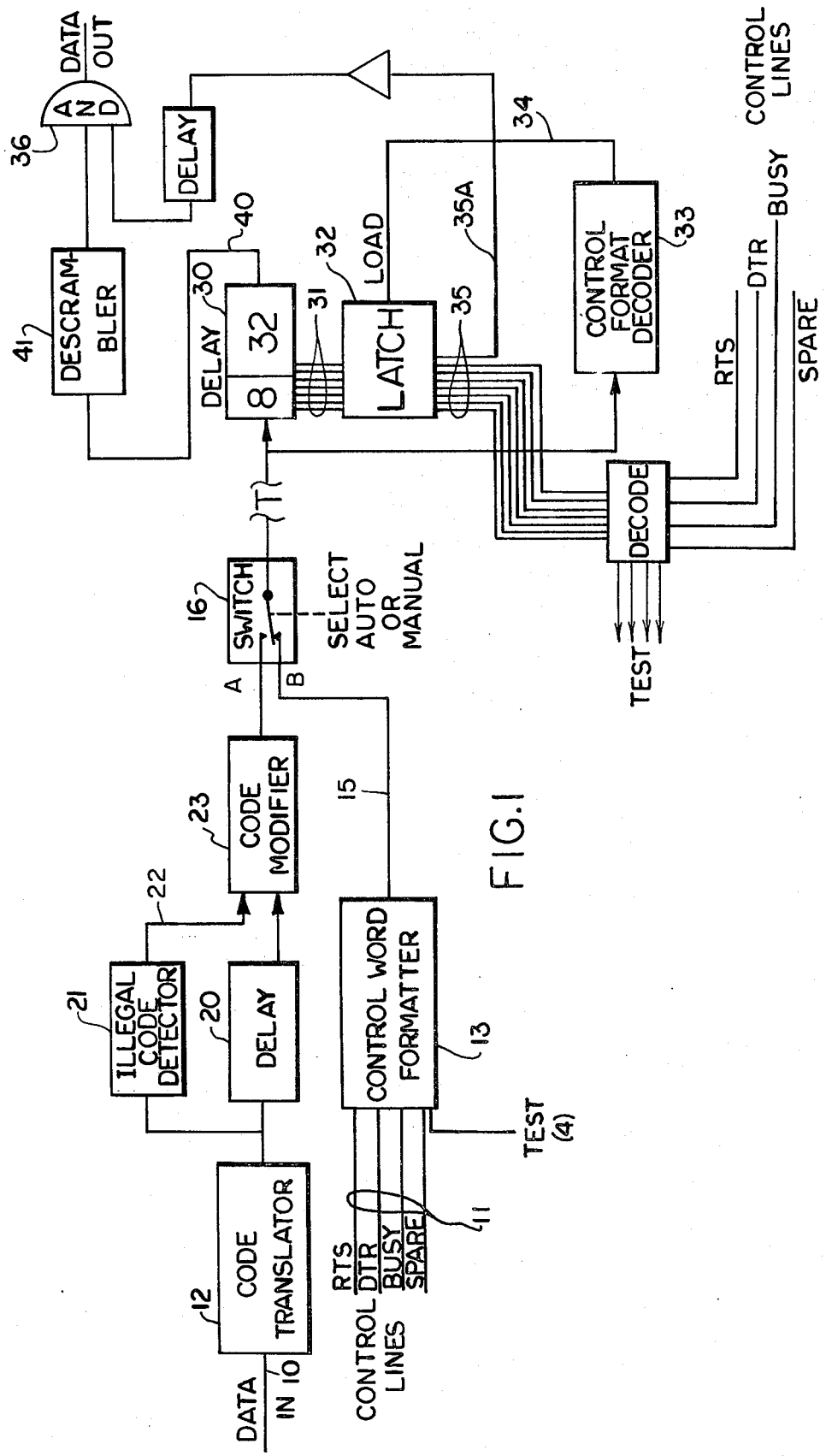
FIG. 1 is a block diagram of a system in accordance with this invention.

Now referring to FIG. 1, showing a transmitter section and a receiver section incorporating this invention, the transmitter section includes an input lead 10 from a data source plus a plurality of input lines 11 for control information. Data on line 10 is introduced into a code translator 12 which applies a linear algorithm to all data. The code translator is, for example, a multi-stage, e.g. 3–11 repeating bit sequence generator of the type disclosed in FIG. 2, or alternately an 8202 encoder, as disclosed in *Signetics Applications Manual*, Sections 3–16, copyright 1973, Signetics Corporation of Sunnyvale, California, 94086, U.S.A. Suffice it to say the code translator 12 modifies the incoming data in a predictable manner. The control lines carrying such signals as Request to Send, Local Loop Test, Remote Loop Test, or any other control signals required for normal operation of a data transmission system for establishing and maintaining communications. These signals are converted into bit sequence formats in a control word formatter 13 which are simply an encoder. Any control signal on its leads 11 is transformed into its distinct bit code and outputed on lead 15 as the B input to a switch 16 or other combining device.

The output of the translator 12 is introduced into a delay circuit 20 and simultaneously into a detector 21 which is programmed to detect any bit combinations constituting control words which might, by coincidence, appear in the modified data train of bits. The detector 21 corresponds to the decoder portion of FIG. 3 which looks for control format bit codes which the data may inadvertently resemble.

The illegal code detector 21 produces an output on lead 22 whenever a control code combination in the transformed data is detected and no output on the absence of such illegal code. Lead 22 is the enabling input to a code modifier or error injector 23 which is connected between the delay circuit 20 and the A input of switch 16. The simplest form of modifier 23 is an inverter which inverts one bit in the sequence. The change of a single bit, as by inversion, often is sufficient at the receiver to be detected as an error. This is true particularly where a parity check is applied to the data as received.

The output of the singly or doubly modified data on lead A is combined selectively with actual control words in switch 16 and introduced into the transmission channel which may be wire, optical or radio as the case may be.

The switch 16, in the preferred embodiment, is normal in the B position as shown whereby it is conditioned to send control words over the transmission channel in order to perform all of the necessary steps for establishing a connection with the receiving station, is in condition to receive data. These functions are often termed the "handshaking" operations of the data communications system. Switch 16 is operated by any suitable means including a start code contained in the data or arriving over control lines, or for that manner, manually.

At the receiving station the initial element is a buffer storage or delay circuit 30 having sufficient capacity to store a full control word including any identifying preamble or ending. In one embodiment, a control is made up of a 31 bit code followed by an 8 bit control code followed by the compliment of the 8 bit control code. In such a case, the delay circuit 30 has two sections, a 31 bit section and an 8 bit section with parallel output leads 31 to a latch circuit 32. Connected in parallel at the input to the receiving station with the delay circuit 30 is a control format decoder 33 which examines all data and control words coming in on the line and when ever a control sequence appears in the train of bits, enables the latch 32 over lead 34. The latch circuit 32 then passes the control code to the controlled circuits of the receiving station via its output leads 35. One of the output leads of the receiving station latch circuit 32, namely lead 35A, carries an output "Carrier On" which indicates that the system next will transmit data. The output of lead 35A is amplified and applied as the enabling input to an AND gate 36 in the received data channel.

The serial output of the delay circuit 30 is lead 40 which carries all received data and control words to a descrambler 41 which performs the inverse transformation on the incoming train of bits as occurred in the code translator 12 of the transmitter. The same decoders as disclosed above may be used for this purpose. The output of the descrambler 41 which is descrambled data and control words, is introduced as the second input to the AND gate 36. The gate 36, of course, is disabled where control words are present, so only passes data which, as it arrives at the transmitting station, or data which, when modified in the code translator 12, coincidentally appears as a control word but which has been modified or corrupted by the modifier 13. The latter, when passed on the utilization device, is easily detected as an error in accordance with well known error detecting techniques presently used almost universally in computers.

When this invention is used, both the data and control words are transmitted on the same channel and there are no restrictions on the format of the data. With the translation of all data in a cyclic fashion, the probability that the data matches a control word is at least as small as the probability of the code words appearing in the raw data. Where the cyclical code is selected to minimize code word generation, this probability is reduced even further.

Figures 2, 3, 4, 5:
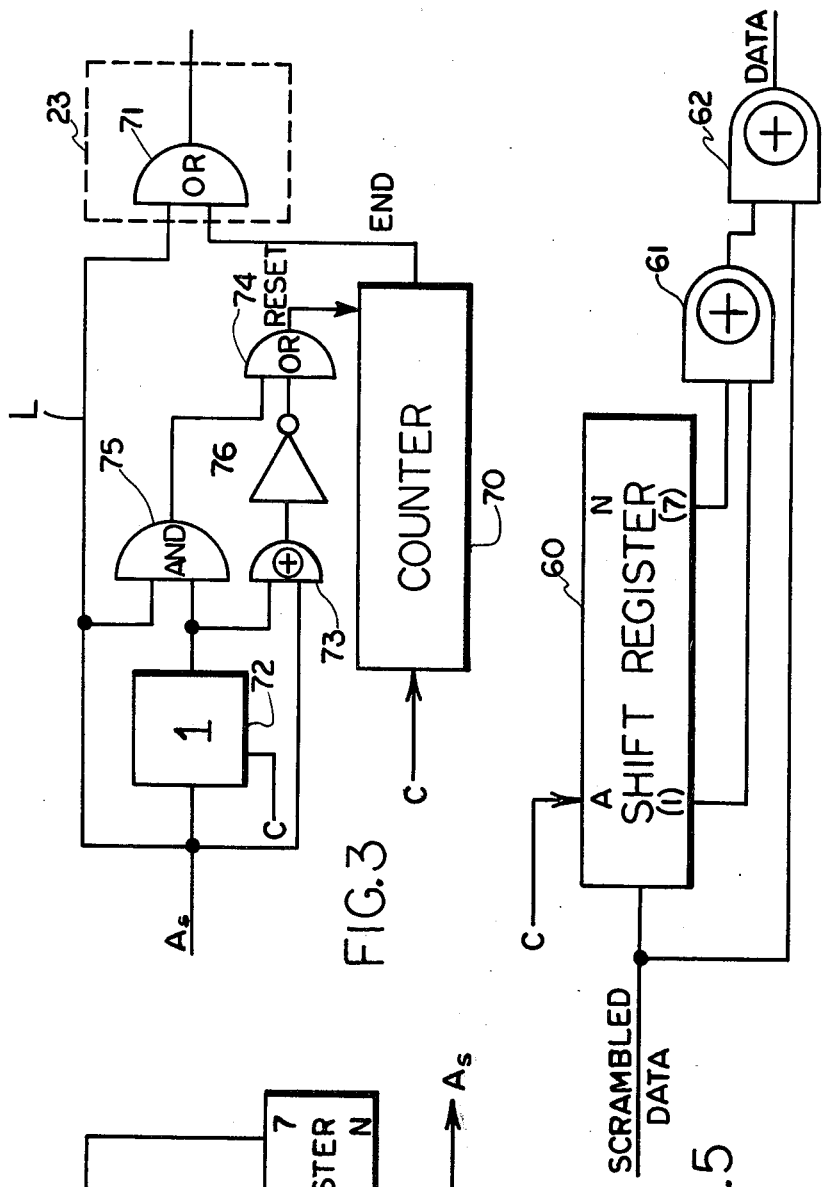
FIG. 2 is a block diagram of a suitable code translator or scrambler for use in connection with this invention.
FIG. 3 is a block diagram of a suitable control word detector for use in accordance with this invention.
FIG. 4 is a pictorial display of a typical control word sequence used in connection with this invention.
FIG. 5 is a block diagram of a suitable data decoder or descrambler used in accordance with this invention.

As an example, a typical code sequence is an $s$ bit preamble followed by $t$ control bits followed by $t$ inverted control bits. In typical applications, $s$ equals a 31 bit sequence and $t$ is 8. This is illustrated in FIG. 4 where the preamble comprises a pair of (1)s followed by alternating (0)s and (1)s for a total of 31 bits. The preamble is followed by an 8 bit control word and then by the 8 bit control word inverted. Other sequences may be used but we have found that an odd numbered bit preamble of sufficient length, e.g. in excess of 25 bits, is recommended. Using a 31 bit preamble the probability of the code appearing in random data is $2^{-31}$ or approximately one half chance per billion. When scrambled in the code translator which employs a seven stage shift register in which data is EXCLUSIVELY ORed with itself in a predetermined, fixed relationship, there, the probability of a code preamble appearing in the translated data is $2^{-31}$.

Even with the small but finite probability of scrambled data producing a code preamble, this data is not introduced into the system since it is further modified or corrupted in the control word preamble detector of FIG. 3. This data simulating control words will not pass through the system which can expect an error in the data to appear in $2^{31}$ bits or an error rate of $10^{-9}$ — a rate far lower than normal data channel error rates of $10^{-5}$ to $10^{-8}$.

Where the system employing this invention requires or allows retransmission of detected errors, the probability of a second or subsequent repeat error existing is $2^{-7}$. This is due to the fact that the encoding technique employs an odd number of bits in the psuedo random sequence, e.g. $2^7 - 1$ or 127, and repeating or cyclical coding of the same data will not occur and data or retransmission will precess with respect to the bit sequence in the scrambler or translator. Where the cyclical code is selected to minimize code word generation, this probability is reduced even further.

Also, employing the above techniques, control word detection is enhanced by the procedure of sending a control word followed by its complement. This is illustrated in FIG. 4. No controls at the receiving station are effected unless a match exists between the control word and its following complement. This is accomplished in the Control Format Decoder 33 which not only examines for preamble but also compares the next 16 bits for complements of the first 8 bits in the second 8 bits. This provides error checking. Normally, control signals are expected several times so that bit errors in the control words can be ignored and the next correct transmission of control words can be detected and used.

A simplified version of a code translator or scrambler 12 is shown in FIG. 2. It comprises a plurality of shift registers 50a to 50n where n, for example, is 7. Data on lead 10 is introduced into EXCLUSIVE OR gate 51 along with the EXCLUSIVE ORed output of the $a(1)$ and $n(7)$ stages of the shift register 50 as combined in second EXCLUSIVE OR gate 52. The logical equation of the translator 12 is:

$$A_s = A \oplus A_{s-a} \oplus A_{s-n}$$

where
$A$ is the incoming data;
$A_s$ is scrambled data;
$A_{s-a}$ is data in stage $a$ of the shift register 50;
$A_{s-n}$ is data in stage $n$ of the shift register 50; and ⊕ denotes the EXCLUSIVE OR function.

At the receiving station, data is easily recoverable employing the inverse of the circuit shown in FIG. 5. It employs a multistage shift register 60 to which scrambled data As is introduced. The output of its $n(7)$ stage is EXCLUSIVELY ORed with the output of its $a(1)$ stage in EXCLUSIVE OR gate 61. The output of gate 61 is EXCLUSIVELY ORed with the scrambled data As in second EXCLUSIVE OR gate 62. The output is thus unscrambled data A.

The descramble equation is simply:

$$A = A_s \oplus A_{s-n} \oplus A_{s-n}$$

As described above in connection with FIG. 1, scrambled data must be continuously monitored for the presence of control word preambles in illegal code detector 21. A suitable detector is shown in FIG. 3 for detecting control code preambles as illustrated in FIG. 4. The detector is configured to search for the sequence of a pair of (1)s followed by alternate (0)s and (1)s. It employs a 31 state ring counter 70, either clocked by each data bit or at the data rate. Scrambled data $A_s$ is introduced over lead L as one input to an OR gate 71. Clocking input C is also introduced into a one stage storage register 72.

Data in register 72 is applied to EXCLUSIVE OR gate 73 plus AND gate 75. Gate 75 detects the appearance of two (1)s appearing in a sequence and resets counter 70 via an OR gate 74. Thereafter, alternate (0)s and (1)s appearing in the scrambled data are monitored by the EXCLUSIVE OR gate 73. Deviation from the alternate pattern will reset counter 70 via an inverter 76 and OR gate 74. If it runs through the full series of alternate (0)s and (1)s after the initial pair of (1)s, it signals a full preamble on its lead END, which it introduces into the preamble at the last bit of the code words appearing in the raw data.

Where the system employing this invention requires or allows retransmission of detected errors, the probability of a second or subsequent repeat error existing is $2^{-7}$. This is due to the fact that the encoding or scrambling in OR gate 71 thereby changing the last (0) to a (1) and corrupting the data to 1101010 - - 11. Any time 2 successive (1)s appear in the data, the counter is reset and the count begins again. As recognized, if a different preamble is desired, the configuration of the detector is changed accordingly.

It is to be recognized that the implementation in general may be changed in accordance with the data and control word format carrying out the method of this invention without departing from the principles disclosed in this specification. The preferred embodiment is shown but one might change the specific embodiment without departing from the spirit and scope of this invention as set forth in the claims below.

The above described embodiments of this invention are merely descriptive of its principals and are not to be considered limiting. The scope of this invention instead shall be determined from the scope of the following claims, including their equivalents.

What is claimed is:

1. In a data communications system, apparatus for transmitting digital data and control signals on a common channel intermixed without restriction as to the format of data transmitted comprising;
    a multi-stage bit generator for generating a train of bits having a repeating sequence;
    means for combining data to be transmitted with the output of said bit generator to modify said data as a function of said bit sequence;
    a control code detector for detecting a predetermined number of bit combinations indicative of control information;
    means for applying the output of said combining means to the input of said control code detector;
    means responsive to the detection of a control code in said output for modifying said output; and
    means for selectively introducing control codes and the output of said last means into a transmission channel.

2. The combination in accordance with claim 1 wherein said multi-stage bit generator has an odd number of stages whereby an odd number of bits is contained in each repeating sequence.

3. The combination in accordance with claim 1 wherein said apparatus includes means for converting all control words into different bit sequences, all preceded by an identical preamble and said control code detector is responsive to the detector of the said preamble of said control codes.

4. The combination in accordance with claim 3 wherein said preamble constituting a series of identical bits followed by alternating bits and said control code detector is enabled responsive to the detection of the required series of identical bits and produces an output indicative of the detection of a control code upon the detection of the required number of alternate bits.

5. The combination in accordance with claim 4 wherein said control word detector comprises a counter and logic means responsive to a series of identical bits to produce an output pulse and said last means connected to reset said counter, said counter responsive to alternating bits and having a number of stages equal to the number of alternating bits in said preamble, the output of said counter connected to introduce a pulse into the stream of data.

6. The combination in accordance with claim 5 including delay means for delaying data for a period of time substantially equal to the period for preamble detection by said control word detector whereby the output pulse of said counter upon the detection of a preamble injects the pulse into the preamble to modify or corrupt it.

7. The combination in accordance with claim 1 wherein said multistage bit generator comprises a shift register having an input and two outputs each from different stages thereof and an EXCLUSIVE OR gate connected with inputs from two outputs of said shift register and output of said EXCLUSIVE OR gate connected to the input of said shift register.

8. The combination in accordance with claim 7 including a second EXCLUSIVE OR gate with one input from the source of data bits, the second input from the output of said first EXCLUSIVE OR gate and the output of said second EXCLUSIVE OR gate connected to the input of said shift register.

9. A method for intermixing digital encoded data and control words on a single communications channel comprising:
    assigning a predetermined multibit preamble to all control words;

scrambling all data in accordance with a cyclical bit sequence by combining it on an EXCLUSIVE OR basis;

examining all scrambled data for the presence of the control word preamble;

modifying the scrambled data whenever a preamble appears therein; and combining the scrambled modified and unmodified data with control words on a single channel.

10. The method in accordance with claim 9 where the cyclical bit sequence is an odd number greater than three.

11. The method in accordance with claim 9 wherein modifying the scrambled data is accomplished by introducing an error into the scrambled data preamble sequence.

12. The method in accordance with claim 11 wherein the error is introduced by inverting one bit in the scrambled data preamble sequence.

13. The method in accordance with claim 9 wherein the data and control words are separated by examination of scrambled data for preambles and extracting the next following sequence as a control word.

14. The method in accordance with claim 9 including transmitting a control word followed by its complement.

15. The method in accordance with claim 14 wherein a control word is disregarded unless followed exactly by its complement.

16. The method of transmitting control words comprising:

generating a code sequence of bits representing a control word;

generating a sequence of bits complementary to the bit sequence representative of the control words;

generating a bit sequence representative of a preamble code; and transmitting the encoded preamble, control word, and compliment of the control word in sequence.

17. The combination in accordance with claim 16 wherein a search for the preamble is conducted and if found, detection of a control word and its complement is required before a control word is considered detected.

* * * * *